United States Patent
Desai et al.

(10) Patent No.: US 7,076,327 B1
(45) Date of Patent: Jul. 11, 2006

(54) SIMULTANEOUS PROCESSING OF MEDIA REQUESTS

(75) Inventors: Ravindranath S. Desai, Mountain View, CA (US); Bruce Voorhees, Mountain View, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 10/883,017

(22) Filed: Jun. 30, 2004

(51) Int. Cl.
*G06F 7/00* (2006.01)
(52) U.S. Cl. .................................. 700/214; 700/213
(58) Field of Classification Search ................ 700/213, 700/214, 218
See application file for complete search history.

(56) References Cited

U.S. PATENT DOCUMENTS

| | | | | |
|---|---|---|---|---|
| 5,768,141 A | * | 6/1998 | Hanaoka et al. | 700/214 |
| 6,038,490 A | * | 3/2000 | Dimitri et al. | 700/214 |
| 6,230,075 B1 | * | 5/2001 | Nishijo et al. | 700/214 |

* cited by examiner

*Primary Examiner*—Khoi H. Tran
(74) *Attorney, Agent, or Firm*—Van Pelt, Yi & James LLP

(57) ABSTRACT

A technique for simultaneously processing media requests is disclosed. It is determined whether a removable storage media resource required to service a first request is currently associated with a second request that is currently being serviced. In the event that the resource is currently associated with a second request, it is determined whether the first request can be interleaved with the second request. In the event it is determined that the first request can be interleaved with the second request, the first request is interleaved with the second request.

17 Claims, 12 Drawing Sheets

SIMULTANEOUS PROCESSING OF MEDIA REQUESTS

CROSS REFERENCE TO RELATED APPLICATIONS

This application is related to co-pending U.S. patent application Ser. No. 10/883,624 entitled PRIORITIZATION AND QUEUING OF MEDIA REQUESTS filed concurrently herewith, which is incorporated herein by reference for all purposes; and co-pending U.S. patent application Ser. No. 10/882,651 entitled EFFICIENT MOUNTING AND DISMOUNTING OF STORAGE MEDIA filed concurrently herewith, which is incorporated herein by reference for all purposes.

Co-pending U.S. patent application Ser. No. 10/737,715 entitled AUTOMATED MEDIA MANAGEMENT filed Dec. 16, 2003, is incorporated herein by reference for all purposes.

FIELD OF THE INVENTION

The present invention relates generally to removable storage media. More specifically, simultaneous processing of media requests is disclosed.

BACKGROUND OF THE INVENTION

Fully or partially automated media libraries, sometimes referred to herein as "libraries" or "robots", are available to store and manipulate removable storage media, such as tapes used to store computer data for backup or archive purposes. A typical library may be equipped with a robotic or other mechanism for manipulating the media stored therein, such as by inserting a selected volume or unit of the media (e.g., a particular tape) into a read/write device associated with the unit, e.g., a tape drive configured to write data to and/or read data from the media. In the computer network environment, e.g., a backup application (sometimes referred to herein as "data mover") may be used to store data from one or more computers or other devices connected to the network (sometimes referred to herein as network "nodes" or "hosts") on storage media associated with a library.

A backup application may request to perform operations such as mounting (installing) a specified tape on a designated drive or removing a tape from a drive (sometimes referred to herein as "dismounting" a tape). A request could include multiple operations, such as a request to export multiple tapes in a library by storing them in another location. When exporting a set of tapes, a robot first moves the tapes to a library door where an operator can then open the door and remove the tapes. Servicing such requests can potentially hold up the servicing of other requests. For example, if a request to export ten tapes is received, and there are only five slots in the door, after the first five tapes are exported to the door, the robot must wait until an operator manually removes the first five tapes before proceeding with exporting the last five tapes. While the process waits, other potentially higher priority requests requiring use of the robot are prevented from being serviced. Other operations involving multiple steps may similarly block other requests from being performed, even during intervals when a resource needed to perform the other request(s) is not actively being used to perform the operation. A method for servicing requests that avoids such blocking and maximizes the use of resources is needed.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Simultaneous processing of media requests is disclosed. In particular, interleaving media requests requiring one or more common resources is disclosed.

Figure 1A:
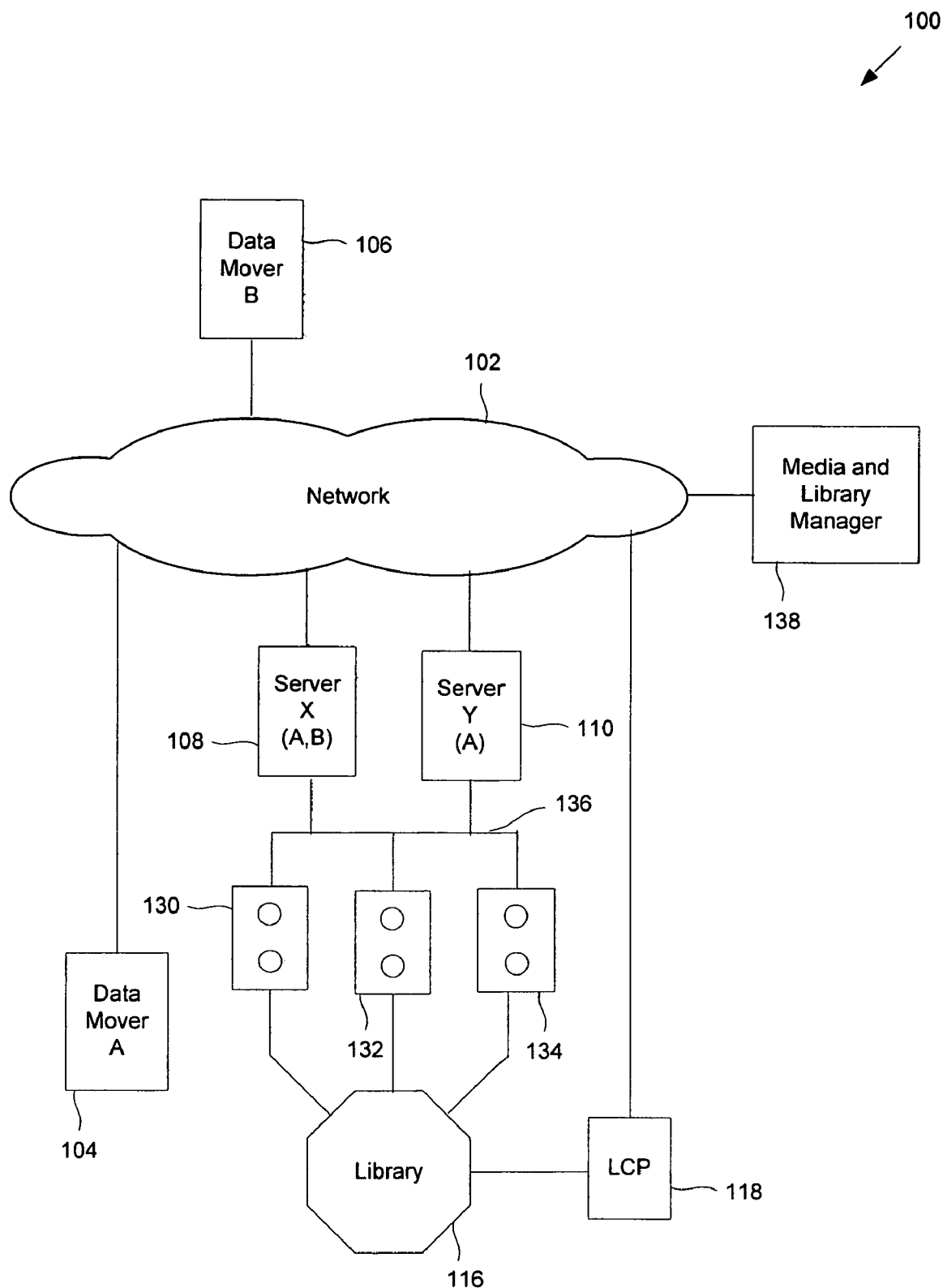
FIG. 1A is a block diagram illustrating one exemplary embodiment of a network environment and a media management system.

FIG. 1A is a block diagram illustrating one exemplary embodiment of a network environment and a media management system. The system 100 comprises a network 102, which may be a local area network (LAN) or any type of private or public network. The system 100 further comprises servers A, B, X, and Y, identified by reference numerals 104, 106, 108, and 110, respectively, in FIG. 1A, connected to network 102. In the example shown in FIG. 1A, a first backup application, such as the NetWorker™ backup application available commercially from the Legato Software Division of EMC Corporation, is installed on server A (104), and a second backup application is installed on server B (106). The first and second backup applications may be the same or different products. In one embodiment, the backup application is a distributed application, and a portion of the backup application (i.e., a data mover agent) is installed on server A (104). The data on server X (108) is backed up by both the first backup application installed on server A (104) and the second backup application installed on server B (106), as is indicated in FIG. 1A by the letters "A" and "B" in parentheses below the letter "X". Such a configuration may be used, e.g., to provide two independent backups for particularly critical data, or where separate data mover programs are each responsible for backing up a separate set of data on the same server. Server Y (110) is backed up by the first backup application installed on server A (104). Server A may likewise comprise a body of data that is backed up by operation of the first backup application installed on server A, and server B may comprise a body of data that is backed up by operation of the second backup application installed on server B. The storage media used by the first and second backup applications installed on servers A and B, respectively, reside in storage media library 116. Storage media library 116 may be of any type. For example, storage media library 116 may be a SCSI library configured to be controlled directly by a library host 118 via a small computer systems interface (SCSI) connection. Storage media library 116 may instead be an ACSLS library, which is an automated cartridge system library software-controlled library of the type available commercially from StorageTechnology Corporation (StorageTek) of Louisville, Colo. An ACSLS-type library is controlled using a software controller provided for that purpose, as opposed to being controlled directly by the library host. Library host 118 is connected to and configured to control library 116. Library host 118 also is connected to network 102. While examples of a SCSI and ACSLS type library are described, any number or combination of types of libraries may be used, including without limitation IBM 3494, ADIC AML, and/or any other type of library. Library 116 has associated with and connected to it tape drives 130, 132, and 134. Tape drives 130, 132, and 134 are connected to servers X (108) and Y (110) via a storage area network (SAN) 136. SAN 136 makes it possible for each of servers X and Y to read from or write to any one of the SAN-connected tape drives 130, 132, and 134.

A media and library manager (MLM) 138 coordinates operations between the first backup application running on server A and the second backup application running on server B, such as by receiving and arbitrating between potentially competing requests for resources associated with library 116, as well as executing such requests. For example, the MLM may receive requests from the backup applications that a particular tape residing in the library be inserted into a tape drive. The MLM may provide other functionality, such as keeping track of tapes stored in the library and elsewhere. MLM 138 has a connection to the network 102, which it uses to communicate with other nodes connected to network 102 as described more fully below. MLM 138 may comprise a server connected to network 102.

As described in U.S. patent application Ser. No. 10/737,715, which is incorporated by reference above, in some embodiments, a library control program (LCP) is installed on library host 118. An LCP is a software agent configured to control a library to be managed by an MLM. The LCP could reside on any host that has a controller connection (e.g., SCSI) the library. Similarly, a drive control program (DCP) is installed on servers 108 and 110 in some embodiments. A DCP is a software agent configured to control a storage device (e.g., a tape drive) to be managed by an MLM. The DCP could reside on any host that has a controller connection (e.g., SCSI) to one or more storage devices. The system could include more than one LCP and more than one DCP, as needed.

Each of servers A, B, X, and Y may comprise different hardware and/or may be running a different operating system (or version thereof). In addition, the type of media stored in library 116 may vary. Also, certain elements may be connected to an associated tape device differently than others. For example, servers X and Y are connected to tape drives 130, 132, and 134 via a SAN, while servers A and B may have direct SCSI connections to other tape drives to which they are connected (not shown).

Figure 1B:
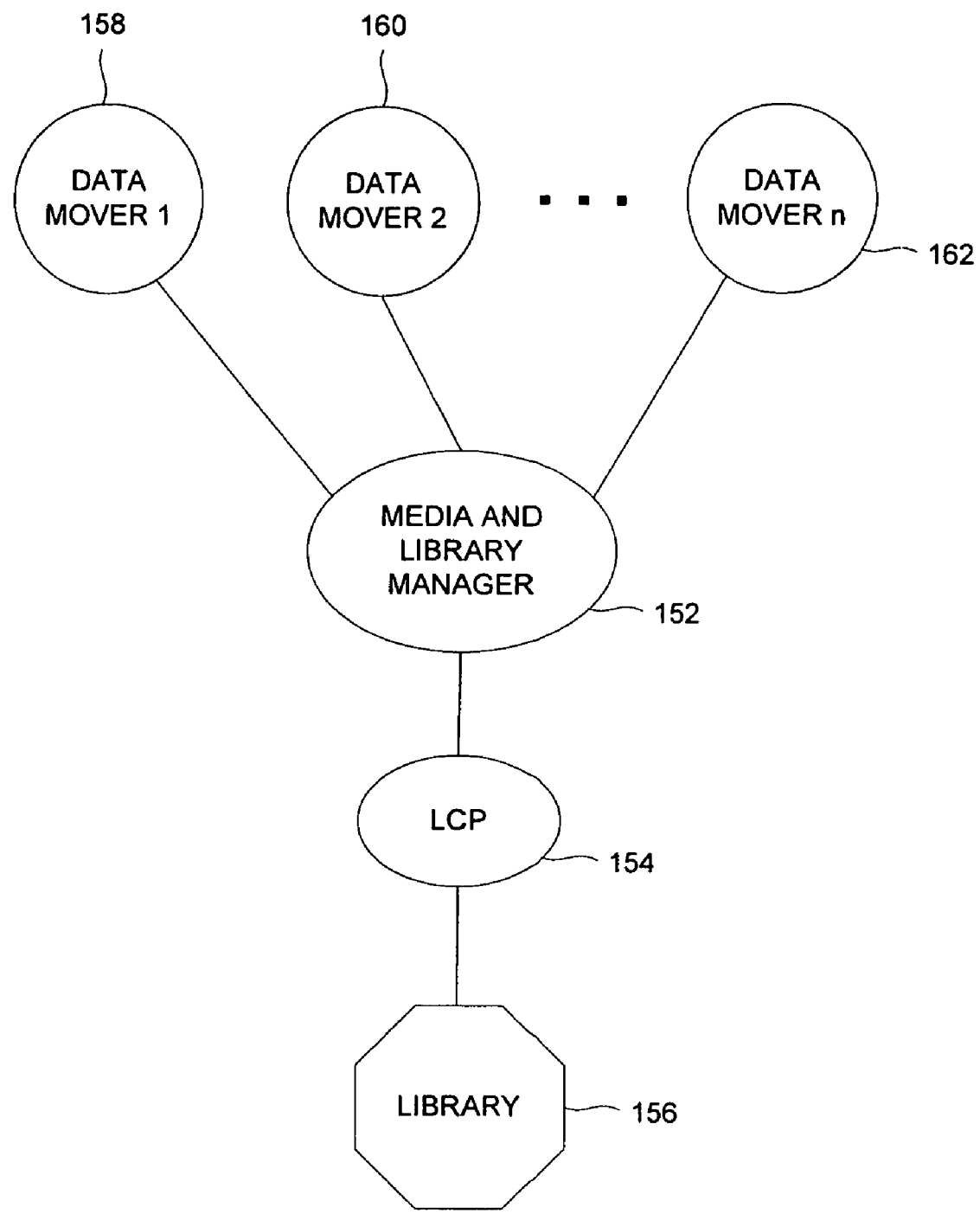
FIG. 1B is a schematic diagram showing the relationship between the media and library manager, the data movers, and the library and associated resources in one embodiment.

FIG. 1B is a schematic diagram showing the relationship between the media and library manager, the data movers, and the library and associated resources in one embodiment. In the example shown, the media and library manager 152 is configured to control the library 156 via the LCP 154. A plurality of data movers 1 to n, represented in FIG. 1B by data movers 158, 160, and 162, each has an interface to the media and library manager, which each uses to send requests for resources and/or operations by the library 156 to the media and library manager 152. The media and library manager 152 services the requests, arbitrating between conflicting requests for the same resource. Using an architecture such as the one shown in FIG. 1B simplifies the development and quality assurance process associated with developing a data mover application, e.g., by enabling the developer to create a single interface to the media and library manager, instead of having to develop a separate hardware interface for each type of library or other resource the data mover application may be required to be configured or configurable to control if the data mover were to be expected to control such libraries or other resources directly, as opposed to relying on the media and library manager to perform such functions. In the approach shown, a hardware interface would have to be developed and validated through a quality assurance process for each type of library, for example, only for the media and library manager 152, and not separately for each data mover application. The approach illustrated in FIG. 1B also facilitates the role of the media and library manager in arbitrating between conflicting or competing requests from different data movers, as described herein. For example, under the approach shown in FIG. 1B only the media and library manager 152 controls the library 156. If each data mover were able to control the library directly, each would think it "owned" the library during times when it was using the library, which could result in other data movers being locked out of use of the library, even if the other data movers had more urgent requests for resources associated with the library. Under the approach shown, the media and library manager can decide which requests from which data mover(s) will be serviced using which resources and at which time, ensuring that the most important requests are serviced first, as described more fully below.

Figure 1C:
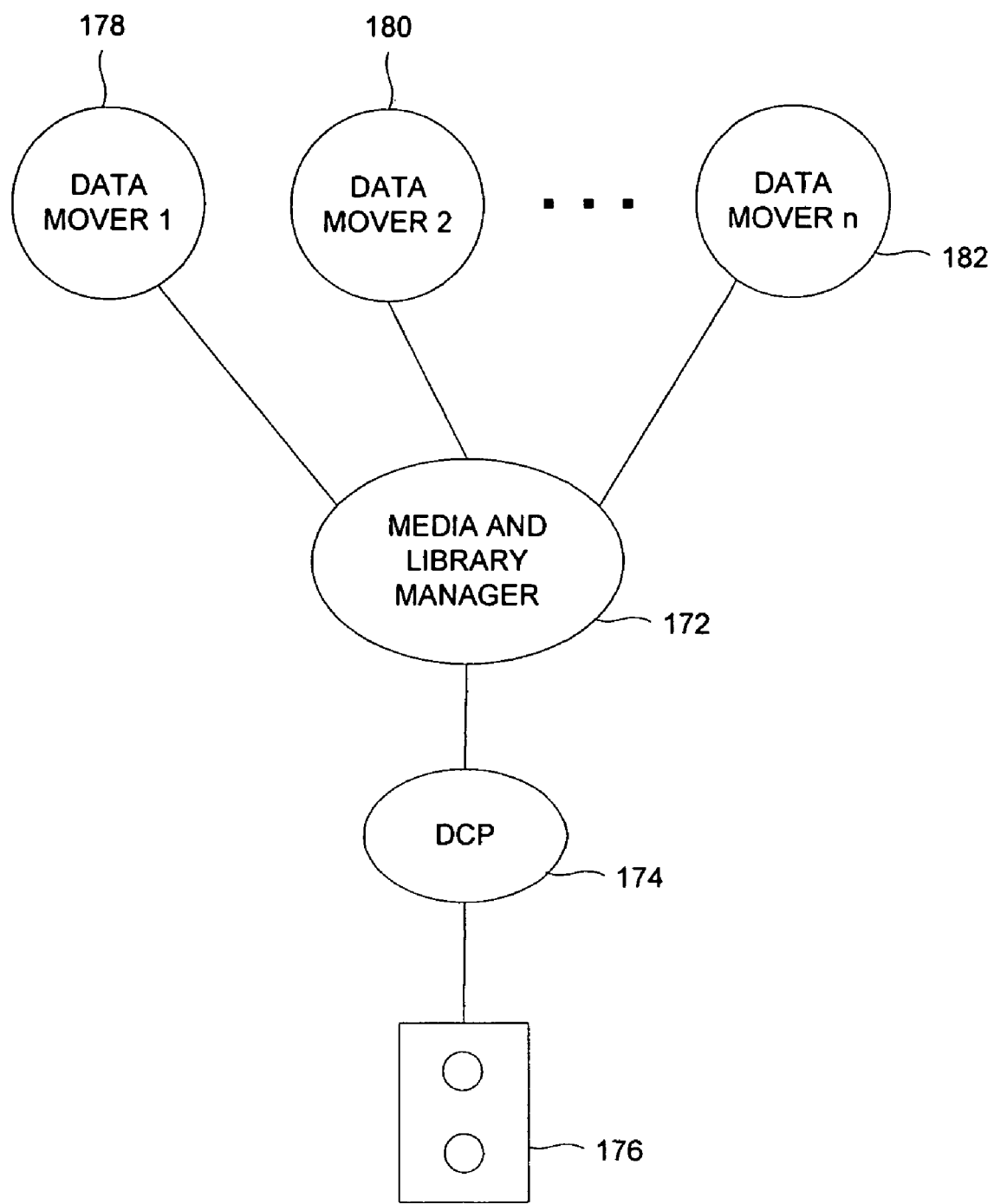
FIG. 1C is a schematic diagram showing the relationship between the media and library manager, the data movers, and a storage device and associated resources in one embodiment.

FIG. 1C is a schematic diagram showing the relationship between the media and library manager, the data movers, and a storage device and associated resources in one embodiment. In the example shown, the media and library manager 172 is configured to control the storage device 176 via the DCP 174. For example, DCP 174 may be configured to communicate with a tape drive via a SCSI connection or a SAN. A plurality of data movers 1 to n, represented in FIG. 1C by data movers 178, 180, and 182, each has an interface to the media and library manager, which each uses to send requests for resources and/or operations by the storage device 176 to the media and library manager 172. The media and library manager 172 services the requests, arbitrating between conflicting requests for the same resource. Using an architecture such as the one shown in FIG. 1C simplifies the development and quality assurance process associated with developing a data mover application, e.g., by enabling the developer to create a single interface to the media and library manager, instead of having to develop a separate hardware interface for each type of storage device or other resource the data mover application may be required to be configured or configurable to control if the data mover were to be expected to control such storage devices or other resources directly, as opposed to relying on the media and library manager to perform such functions. In the approach shown, a hardware interface would have to be developed and validated through a quality assurance process for each type of storage device, for example, only for the media and library manager 172, and not separately for each data mover application. The approach illustrated in FIG. 1C also facilitates the role of the media and library manager in arbitrating between conflicting or competing requests from different data movers, as described herein. For example, under the approach shown in FIG. 1C only the media and library manager 172 controls the storage device 176. If each data mover were able to control the storage device directly, each would think it "owned" the storage device during times when it was using the storage device, which could result in other data movers being locked out of use of the storage device, even if the other data movers had more urgent requests for resources associated with the storage device. Under the approach shown, the media and library manager can decide which requests from which data mover(s) will be serviced using which resources and at which time, ensuring that the most important requests are serviced first, as described more fully below.

Figure 2:
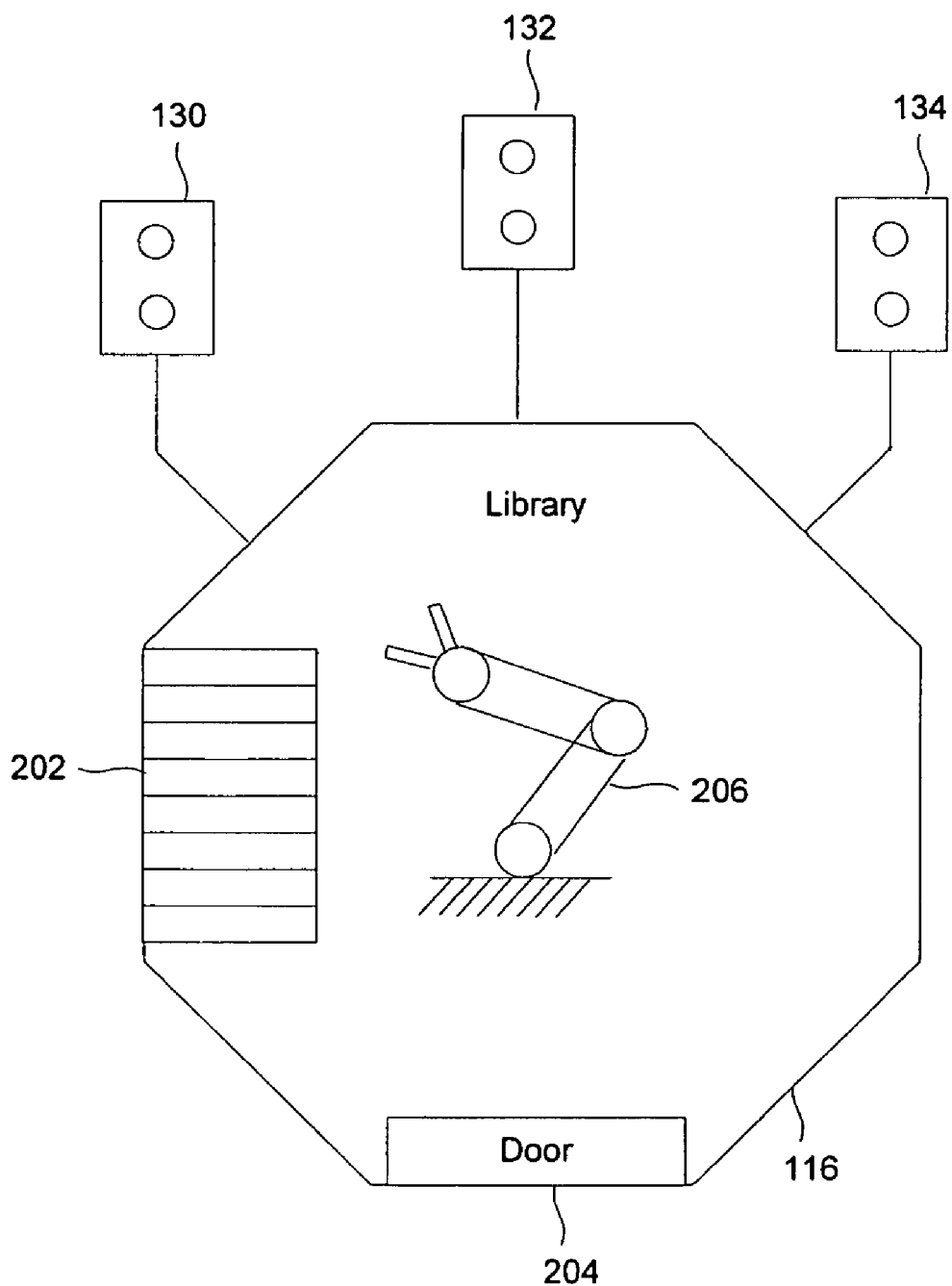
FIG. 2 is a block diagram illustrating one embodiment of a storage media library.

FIG. 2 is a block diagram illustrating one embodiment of a storage media library, such as library 116 from FIG. 1A. In this example, storage media library 116 is shown to include media slots 202, robot 206, and door 204. Other devices not shown that may be included in a library include a printer, a flipper (for multi-sided media), and removable magazines of media, which, similarly to media slots 202, have their own door and can be pulled entirely out of the library. Media slots 202 may, for example, be physical shelves on which media (e.g., tapes) are stored. A particular tape may have a home shelf where it is placed after an operation associated with the tape is completed. Robot 206 is a robotic or other mechanism for manipulating the media, such as by inserting a selected volume or unit of the media (e.g., a particular tape) into a read/write device associated with the library, e.g., a tape drive configured to write data to and/or read data from the media, such as tape drive 130, 132, or 134. Door 204, which may also be referred to as a mailbox or a cap, may be used to import (inject or add) or export (eject or remove) media to or from the library. For example, to archive a set of tapes in the library by storing them in another location, those tapes may be exported to door 204, where an operator can then open the door and remove the tapes.

Figure 3:
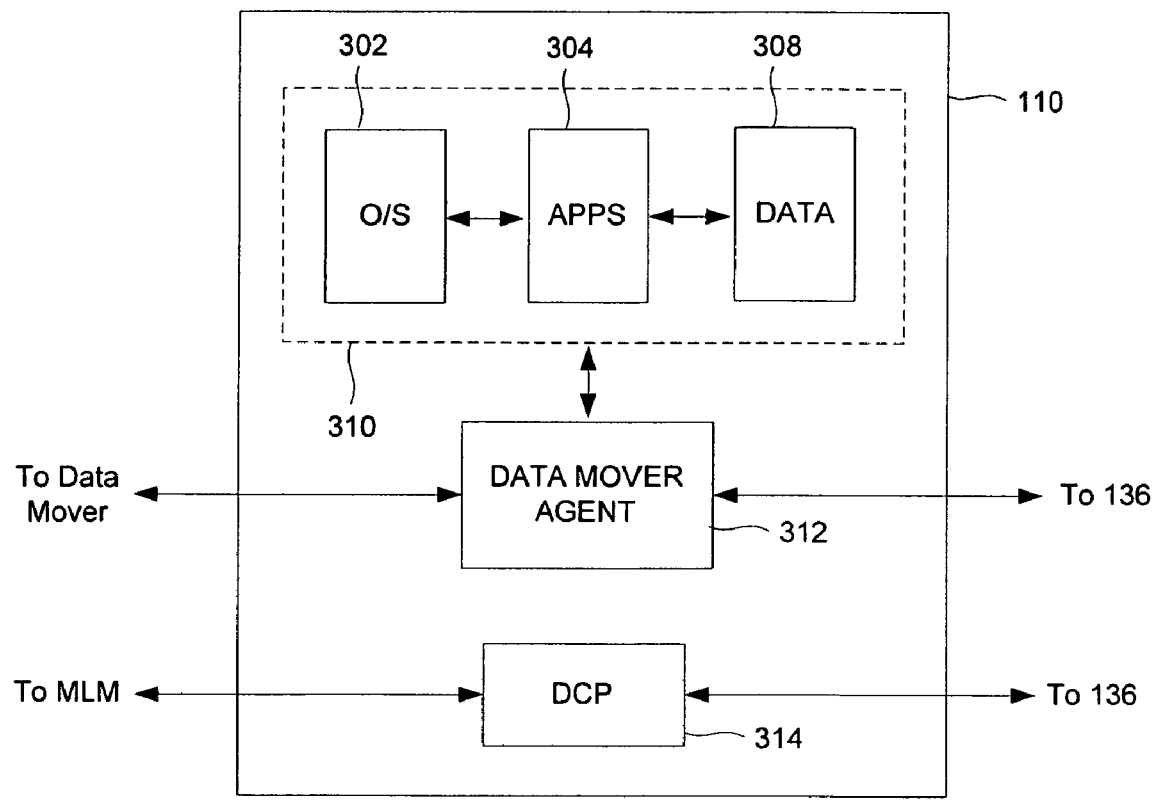
FIG. 3 is a block diagram illustrating one embodiment of a server.

FIG. 3 is a block diagram illustrating one embodiment of a server, such as server Y (110) from FIG. 1A. In this example, server 110 is shown to include an operating system 302, applications 304, and data 308, which serve the primary functionality 310 of server 110. Data mover agent 312 resides on server 110 to allow data mover A (i.e., the data mover on server A) to control a storage device (e.g., tape drive 130) associated with server 110. In some embodiments, the entire data mover resides on server 110 and data mover agent 312 is the entire data mover application. In some embodiments, server 110 includes more than one data mover agent, depending on how many data movers are configured to manipulate data on server 110. For example, in the case of server X (108) of FIG. 1A, each of data movers A and B would have an agent installed on server X, because each is configured to move data to/from server X.

DCP 314 resides on server 110 to allow a properly configured application or device, such as MLM 138, to control a storage device (such as tape drive 130) associated with server 110. For example, DCP 314 may receive and generate in response to a command from MLM 138 or data mover agent 312 a control message to control tape drive 130 as required, e.g., to cause the drive to eject a tape. In the example shown in FIG. 1A, the DCP 314 may be configured to communicate with drive 130, e.g., via SAN 136.

In some embodiments, data mover agent 312 and DCP 314 are connected to network 102 using a network interface card or other appropriate device. Thus data mover agent 312 and DCP 314 can communicate over the network with an associated data mover and the MLM, respectively.

Figure 4:
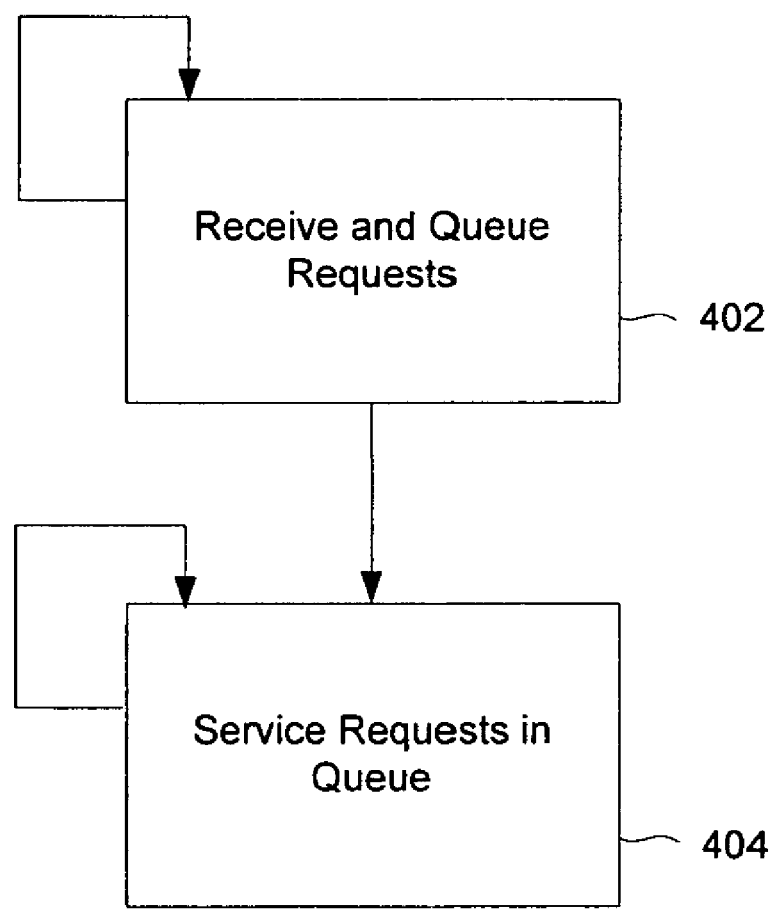
FIG. 4 is a flowchart illustrating a method used in one embodiment to coordinate media requests.

FIG. 4 is a flowchart illustrating a method used in one embodiment to coordinate media requests. The process shown in FIG. 4 may be implemented, for example, on a media and library manager such as MLM 138 of FIG. 1A. Requests are received and queued (402). Such requests may come from multiple data movers. A request may be made of a library system to perform certain operations, such as providing a list of devices associated with the library, providing the library's device identifier for each such device, providing an inventory of tapes in the library, mounting (installing) a specified tape on a designated drive, removing a tape from a drive (sometimes referred to herein as "dismounting" a tape), importing a tape to the library, exporting a tape from the library, moving a tape from one slot to another within the library, and providing an audit of tapes in the library without updating the library database. Likewise, a request may be made of a host having a connection to one or more storage devices to perform such functions with respect to devices to which it has a connection, such as providing a list of devices to which it is connected, providing a path on the host to each device (e.g., a device file), determining and reporting whether a particular device is on line, and causing a tape to be ejected from a device. Such requests may be continuously received and queued, as indicated in FIG. 4 by the arrow looping back to step 402. The process of receiving and queuing requests may be followed by or performed in parallel with a process of servicing requests in the queue (404). Requests in the queue may be continuously serviced, as indicated in FIG. 4 by the arrow looping back to step 404.

Figure 5:
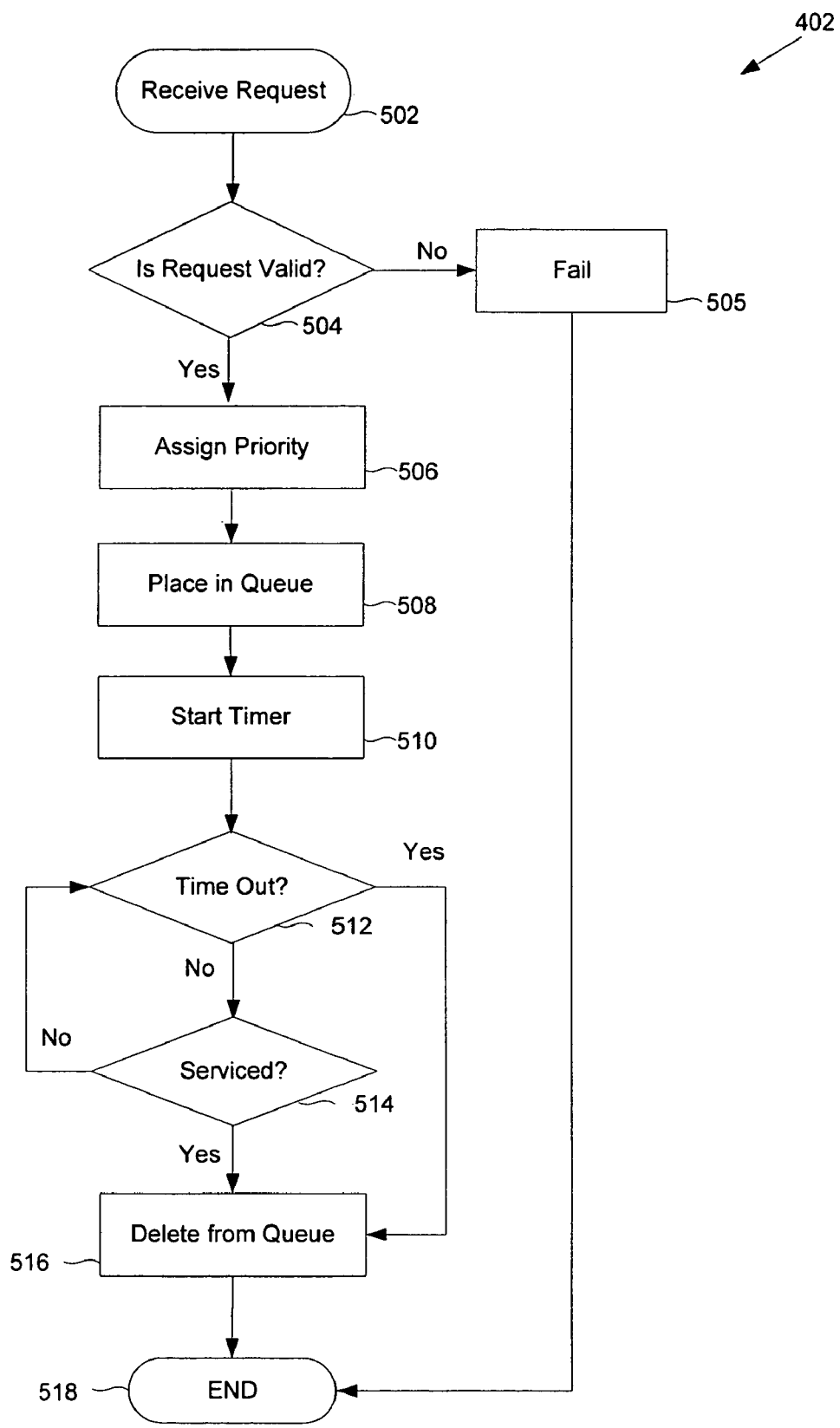
FIG. 5 is a flowchart illustrating a method used in one embodiment to receive and queue requests.

FIG. 5 is a flowchart illustrating a method used in one embodiment to receive and queue requests. In one embodiment, this process is used to perform step 402 of FIG. 4. In this example, a request is received (502). For example, a request requiring access to or information about a device, library, or associated host is received. The request may be received from a remote host, such as a server on which a data mover is running (e.g., server A or server B in the example described above in connection with FIG. 1A). The request may also be generated by a process associated with the MLM itself, such as a configuration process or a process associated with a command or request received from a user (e.g., via a user interface), e.g., a request for an audit of tapes in a library.

It is determined whether the request is valid (504). For example, the request may not be physically possible. A request to access a particular tape that is not in the library, for example, may be determined to be invalid. The request may also be determined to be invalid if the tape is in the library but no drive that is both compatible with the tape and accessible by a host associated with the request is online. In some embodiments, if a requested tape is already in a drive reserved by another application, the request is determined to be invalid. If the request is determined to be invalid, the request fails (505), and the process ends (518). In some embodiments, an error report is generated. If the request is determined to be valid, a priority is assigned to the request (506), as described more fully below. The request is placed in a queue (508). In one embodiment, the request is placed in the queue based on its assigned priority. In one embodiment, the assigned priority is a normalized priority, i.e., differences, if any, between the priority schemes used by the respective sources of the requests are resolved and a priority assigned to each request under a common scheme. A timer is started (510). The timer is associated with the request such that if a preconfigured amount of time has passed and the request has not been serviced, the request times out and the request may be deleted from the queue. As such, it is determined whether the request has timed out (512). If the request has timed out, the request is deleted from the queue (516). In one embodiment, the time out is reported. If the request has not timed out, it is determined whether the request has been serviced (514). If the request has not been serviced, the process returns to step 512. If the request has been serviced, the request is deleted from the queue and the process ends (518). A data mover can continuously generate requests without having to wait until an earlier request is finished being serviced. When a request is finished being serviced, the data mover is notified.

In some alternative embodiments, not illustrated in FIG. 5, if the request is determined to be valid (504), it is determined with respect to at least certain types of request whether the request can be serviced immediately, without placing it in a queue. If the request can be serviced immediately, the request is serviced. For example, if a data mover sends a request to mount a tape in a compatible drive, and the required tape is already in a compatible drive, the drive is reserved for the data mover (if it is not already reserved), and the data mover is notified that the mount is successfully complete. Thus, in such an embodiment a request is not necessarily queued.

Figure 6:
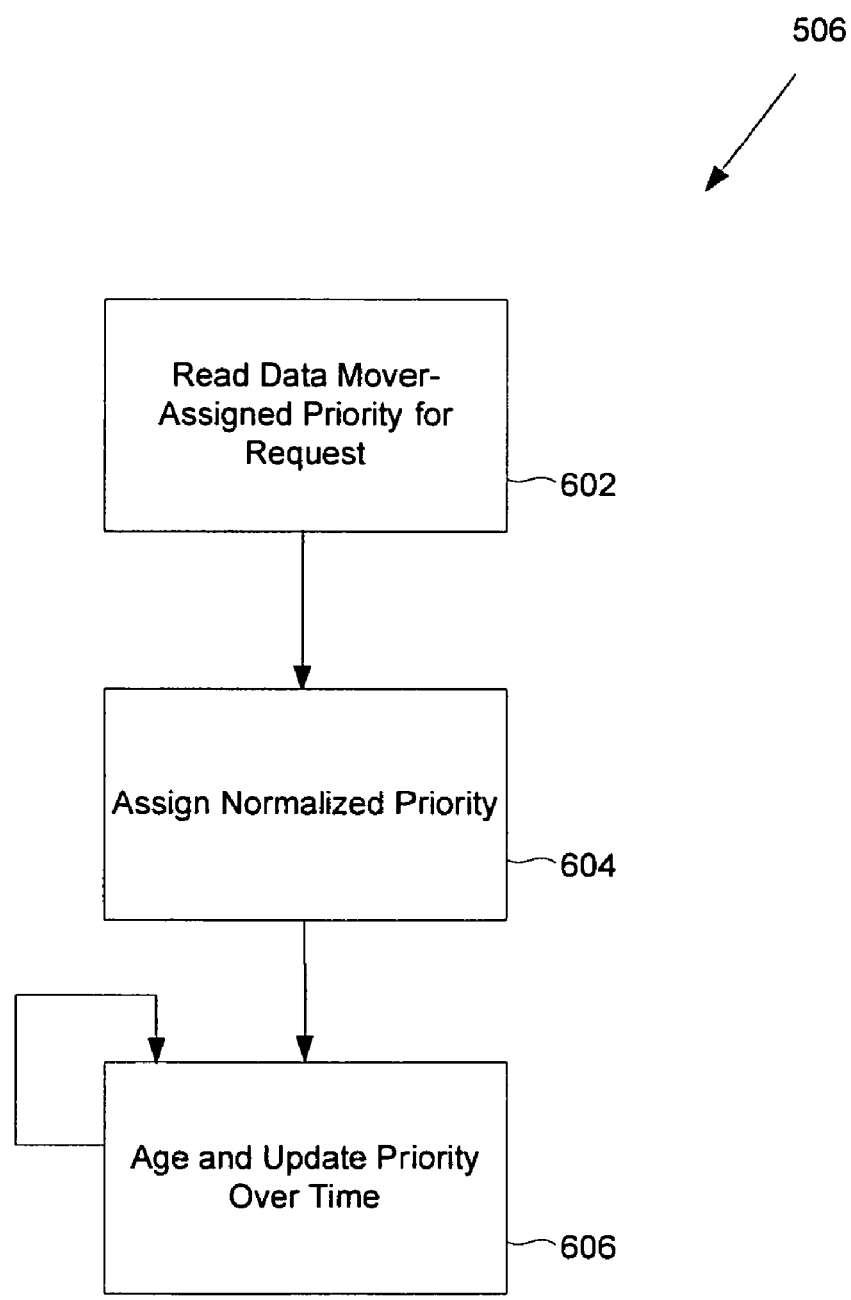
FIG. 6 is a flowchart illustrating a method used in one embodiment to assign a priority.

FIG. 6 is a flowchart illustrating a method used in one embodiment to assign a priority. In one embodiment, this process is used to perform step 506 of FIG. 5. In this example, the data mover-assigned priority for the request is read (602). The data mover-assigned priority is the priority of the request from the data mover's perspective, i.e., relative to the priorities of other requests from the data mover. In some cases, the priority may be assigned under a priority scheme used by the data mover (or other requesting device, application, or process) that is different from the priority scheme used by one or more other data movers or other request sources. For example, referring to the environment shown in FIG. 1A and described above, the data mover running on server A may send a request to the MLM that tape WXY456 be installed in drive 130, e.g., for purposes of backing up data on server X. The same data mover may also send a request to audit tapes in library 116. Because there may be less urgency to know audit results of tapes in library 116, the data mover may assign a higher priority to the request that tape WXY456 be installed on drive 130. A normalized priority is assigned to the request (604). The normalized priority is the priority of the request from the MLM's perspective, i.e., relative to the priorities of other requests received by the MLM and independent of any differences that may exist between the priority assignment schemes used by the different sources from which the MLM may be configured to receive requests. In one embodiment, the normalized priority is a function of the data mover and the data mover-assigned priority. For example, a request from NetWorker™ with a data mover-assigned priority of 3 may have a lower normalized priority than a request from DX2000™ (another type of data mover) with a data mover-assigned priority of 3, as may be the case for example if NetWorker™ used a priority scheme having priorities between 1 and 5 but DX2000™ assigned priorities between 1 and 10. Still other data movers might use other priority schemes, such as "A", "B", and "C" or "high" and "low". In one embodiment, a dismount request has the highest normalized priority, unless there is a very old or very important request (with a higher normalized priority). In some embodiments, the data mover-assigned priority is converted to the normalized priority based on a configuration file maintained by the MLM. The priority is optionally aged and updated over time (606). Aging and updating the priority may help prevent the request from being "starved" at or near the bottom of the queue. For example, the priority associated with a particular request may be configured to increase for every (predetermined) unit of time that elapses. Eventually, if the request is not serviced during this time, the priority of the request reaches a high enough priority that it is serviced. Aging and updating the priority may be a continuous process, as indicated in FIG. 6 by the arrow looping back to step 606.

Figure 7:
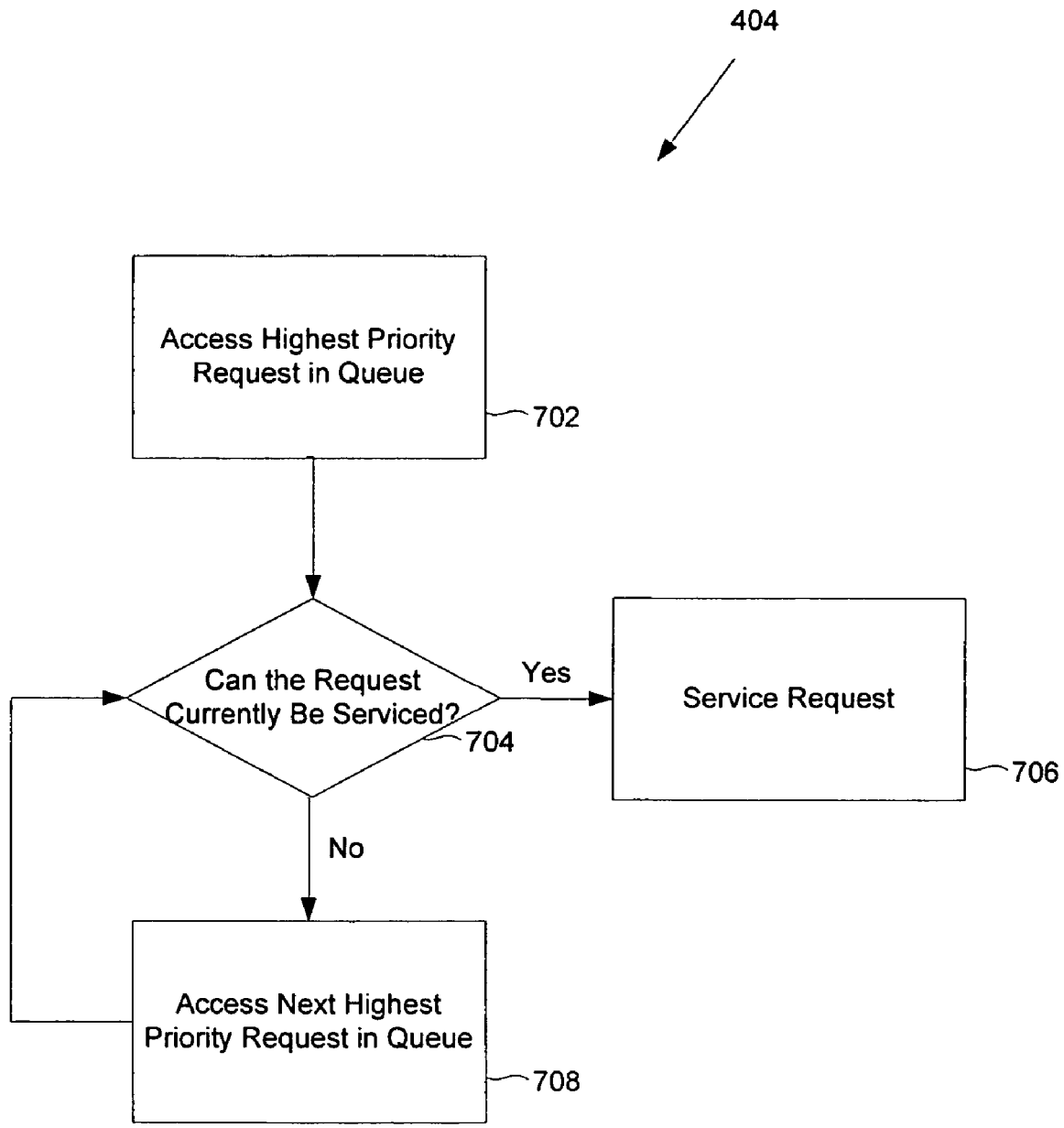
FIG. 7 is a flowchart illustrating a method used in one embodiment to service requests in a queue.

FIG. 7 is a flowchart illustrating a method used in one embodiment to service requests in a queue. In one embodiment, this process is used to perform step 404 of FIG. 4. The highest priority request in the queue is accessed (702). It is determined whether the request currently can be serviced (704), as described more fully below. If the request currently can be serviced, the request is serviced (706), as described more fully below. If the request cannot currently be serviced, the next highest priority request in the queue is accessed (708) and the process returns to step 704. Steps 708 and 704 are repeated until a request that can currently be serviced is identified and serviced.

Figure 8:
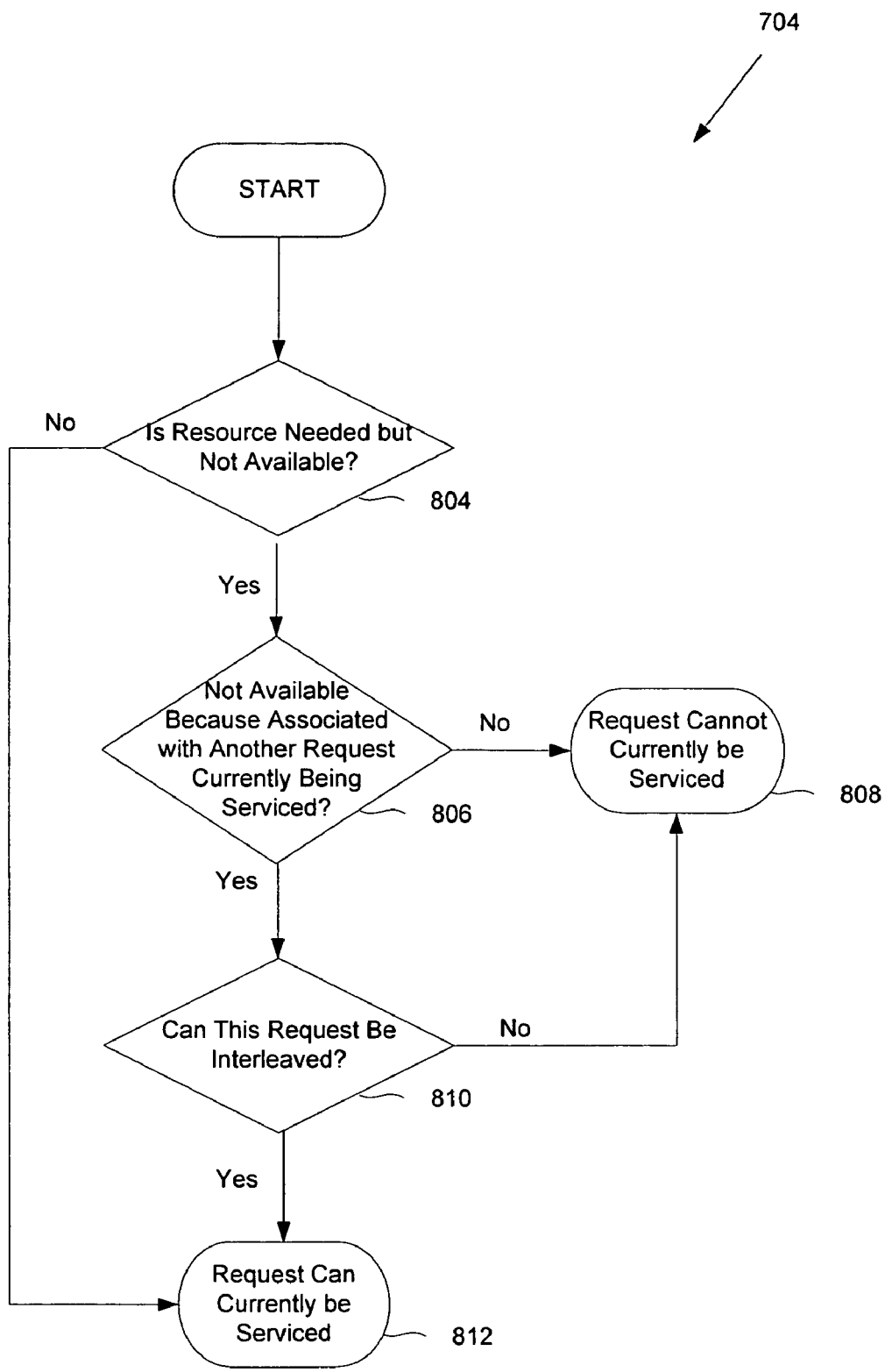
FIG. 8 is a flowchart illustrating a method used in one embodiment to determine whether a request can currently be serviced.

FIG. 8 is a flowchart illustrating a method used in one embodiment to determine whether a request can currently be serviced. In one embodiment, this process is used to perform step 704 of FIG. 7. In this example, it is determined whether a resource would be needed but is not available (804). For example, the resource could be a robot, storage device (e.g., drive), or media volume (e.g., tape). As used herein a resource is "available" if it is currently operational (i.e., "on line") and not currently reserved for use in servicing another request. For example, if the request is to mount a particular tape in a particular drive, a robot, the drive, and the tape would be needed to perform the request. If the robot is currently reserved for use in servicing another request (e.g., mounting or dismounting another piece of media), the robot is not available. If the drive is not empty, the drive may or may not be available. For example, the drive may be in a lazy dismount state, in which the drive has in it a tape from an earlier completed operation that has not yet been dismounted and would not normally be dismounted until a lazy dismount timer has expired. Such a drive may be determined to be available, e.g., if it is not currently reserved or if there is a way to preemptively dismount the drive when it is in a lazy dismount state, as described in U.S. patent application Ser. No. 10/88,651, which is incorporated by reference above. If all needed resources are available, the request can currently be serviced (812). If a resource is needed but not available, it is determined whether the needed resource is unavailable because it is associated with another request that is currently being serviced (806). If the resource is unavailable not because it is associated with another request that is currently being serviced, but for some other reason (e.g., a required tape is not present in the library or a required drive is offline), the request cannot currently be serviced (808). If it is determined that the resource is unavailable because it is associated with another request that is currently being serviced, it is determined whether the current request can be interleaved with the request for which the resource is currently reserved for use in servicing (810). Determining whether the request can be interleaved can, for example, be based on the nature of the request (e.g., the type of operation required to satisfy it), the priority of the request relative to that of the other request for which the resources is currently reserved, or the stage of completion of the other request. The other request (i.e., the one for which the needed resource is reserved) may include an indication (e.g., a flag) of whether the request can be interleaved. In some embodiments, if it is not possible to interleave the current request with the other request currently being serviced (e.g., because the other request has a higher priority, the two requests would require incompatible uses of the resource, etc., it is determined in step 810 that the current request cannot be interleaved with the other request. If the request can be interleaved, it is determined that the request can currently be serviced (812). If the request cannot be interleaved, it is determined that the request cannot currently be serviced (808).

In one embodiment, if it is determined that the request cannot currently be serviced (808), the request is queued (or re-queued, as applicable) until the resource becomes available. If the reason that the resource is not available is the required resource (e.g., drive or tape) is offline, then it is determined in step 806 that the resource is unavailable for a reason other than that it is reserved for use in servicing another request, the request fails, and a failure notification is sent to the data mover.

Figure 9:
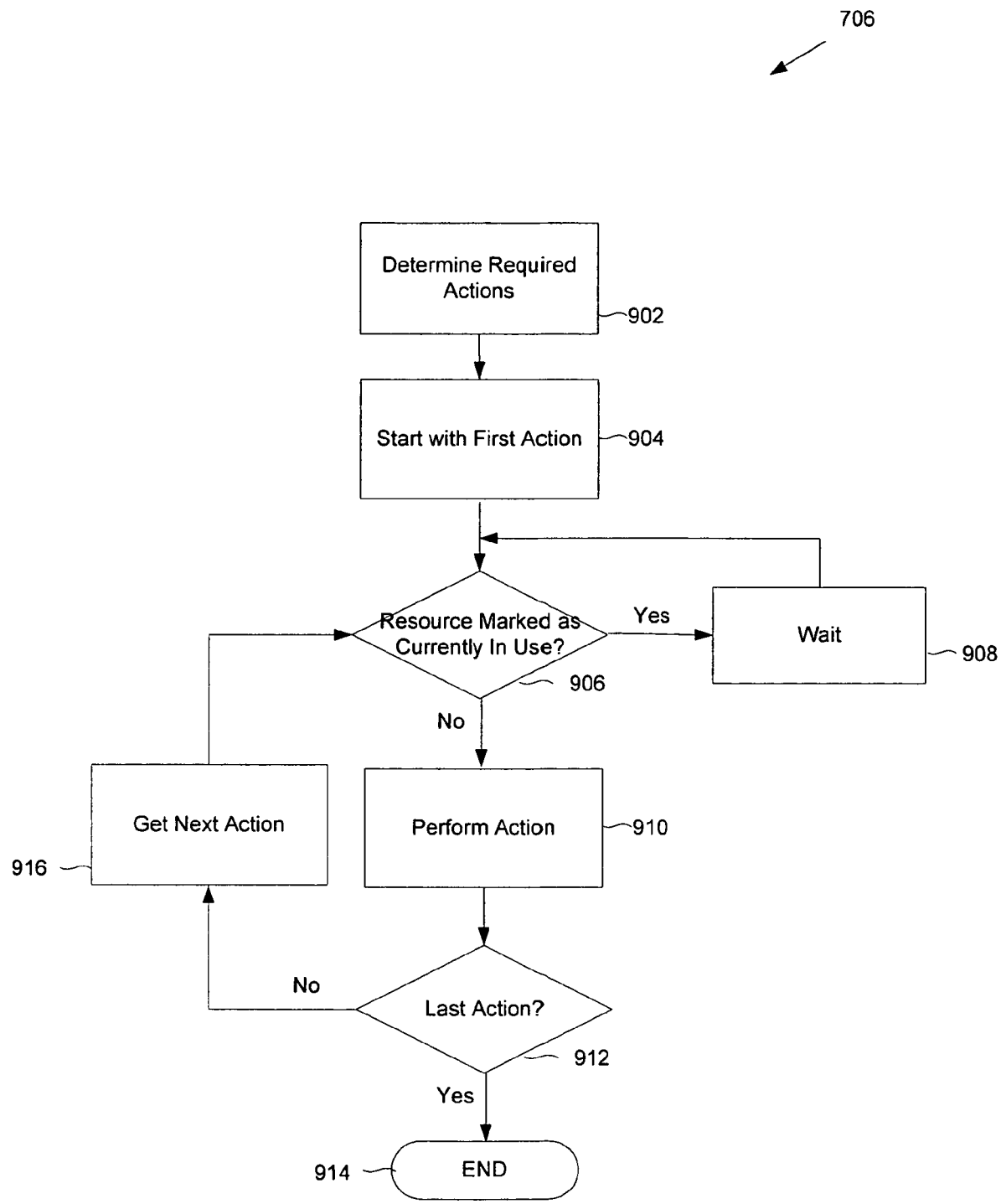
FIG. 9 is a flowchart illustrating a method used in one embodiment to service a request.

FIG. 9 is a flowchart illustrating a method used in one embodiment to service a request. In one embodiment, the process of FIG. 9 is used to perform step 706 of FIG. 7. In one embodiment, the process of FIG. 9 is used to perform step 706 of FIG. 7 only with respect to a request that is being interleaved with one or more other requests. In this example, the actions required to service the request are determined (902). A request (to perform one or more operations) can be broken down into a series of constituent actions. For example, a mount request may be broken down into multiple constituent actions each associated with one or more control messages required to be sent to cause the action to be performed. A control message, as used herein, is a message sent from a control program (e.g., LCP or DCP) to a device (e.g., a library or drive) to cause it to perform an action or a portion thereof. In one embodiment, each action into which a request is broken up comprises a step or series of steps that must be performed completely before the resources required to perform the action may be considered potentially available to perform an action associated with another request that is being interleaved with the request with which the action is associated. For example, a request to export ten tapes can be broken down into the following constituent "actions": "move robot to shelf 1", "pick up tape 1", "move robot to door", "place tape 1 in door", "move robot to shelf 2", "pick up tape 2", etc. Alternatively, the same request could be broken down into ten "actions", each to move one of the tapes from its home slot to the library door. In that case, each action would involve the sub-steps of moving the robot to the home slot, picking up the tape, etc. Depending on the hardware and/or its configuration, each such sub-step may require that a hardware command be sent to cause the sub-step to be performed, such that a single "action" may require that multiple hardware commands be sent.

To export ten tapes, as in the example just discussed, a data mover might generate, for example, ten separate requests (e.g., "export tape 1", "export tape 2", . . . , "export tape 10"), two requests (e.g., "export tapes 1–5" and "export tapes 6–10"), or any other number or grouping of requests. Likewise, each request may be broken down by the MLM into one or more constituent actions or groups of constituent actions required to satisfy the request. In some embodiments, the MLM includes logic for determining whether and how to break a request into one or more actions or groups of actions to permit or facilitate interleaving. In some embodiments, the request includes information about how its constituent actions should be grouped when interleaving.

Starting with the first action (904), it is determined whether the resources required to perform the first action are marked as "currently in use" (906). In one embodiment, as described more fully below in connection with FIG. 10, the resource(s) required to perform an action is/are marked as "currently in use" while an action is being performed and unmarked when the action has been completed, indicating that the resource(s) may be used to perform another action associated either with the same request or with another request being interleaved with the request with which the completed action is associated. If any resource required to perform the action is marked as currently in use, the process waits (908) until the resource is no longer so marked. In some embodiments, if the wait lasts beyond a prescribed time limit, the request fails or an operator is prompted to determine whether to continue waiting. If the resource is not marked as "currently in use", the action is performed (910), as more fully described below. It is determined whether the action is the last action required to service the request (912). If the action is the last action, the process ends (914). In some embodiments, the data mover (or other originator of the request) is notified that the operation is complete. If the action is not the last action, the next action is obtained (916) and the process returns to step 906.

In this example, the actions associated with the request may interleave with the actions associated with one or more other requests. For example, a request to export ten tapes (from a library with a five slot door) and a request to mount two tapes can be interleaved by first exporting five tapes, mounting one tape (while waiting for an operator to remove the five exported tapes (908)), exporting the remaining five tapes once an indication has been received that the first five tapes have been removed from the door and it is determined that the interleaved mount operation has been completed such that the robot is available to complete the servicing of the export request by exporting the remaining five tapes, and then mounting the last tape. The requests can be interleaved in any other appropriate way. For example, one or both requests could be interleaved at a higher or lower level of granularity, where a higher level of granularity means more actions are grouped and performed together before one or more actions associated with another request can be interleaved.

In this example, the process waits for each action to be complete before moving to the next action. In some embodiments not shown, the process includes additional logic for determining whether the next or other actions can be performed simultaneously, for example where different resources are required to perform the actions and the actions are not mutually incompatible (e.g., they would interfere with one another) and/or it is not required that one be completed before the other can be performed.

In some embodiments, the extent of interleaving is determined by the capabilities of the hardware associated with the library. For example, some libraries may be configured such that opening the door limits movement of the arm (e.g., the door rotates open in such a way that it blocks the arm). In this case, to interleave a mount operation with an ongoing export operation, the first robotic action associated with the mount must wait until the door is rotated (or closed) out of the way of the arm. Alternatively, the system may be configured such that no attempt is made to interleave imports and exports with other operations, such as mount operations. The capabilities of the hardware as they relate to the ability of the hardware to support interleaving various types of operation may be provided by a configuration file or the MLM may request such information from the library.

In some embodiments, the extent of interleaving is determined by user preferences. For example, the level of interleaving may be lowered by the user even if the library hardware appears to support it. A user may, for example, set a preference to not interleave a mount operation with an export operation because employee time is considered to be too valuable to be spent waiting the extra time it might take the export operation to be complete if another operation were to be interleaved with it. A user interface may be provided to select such preferences.

Figure 10:
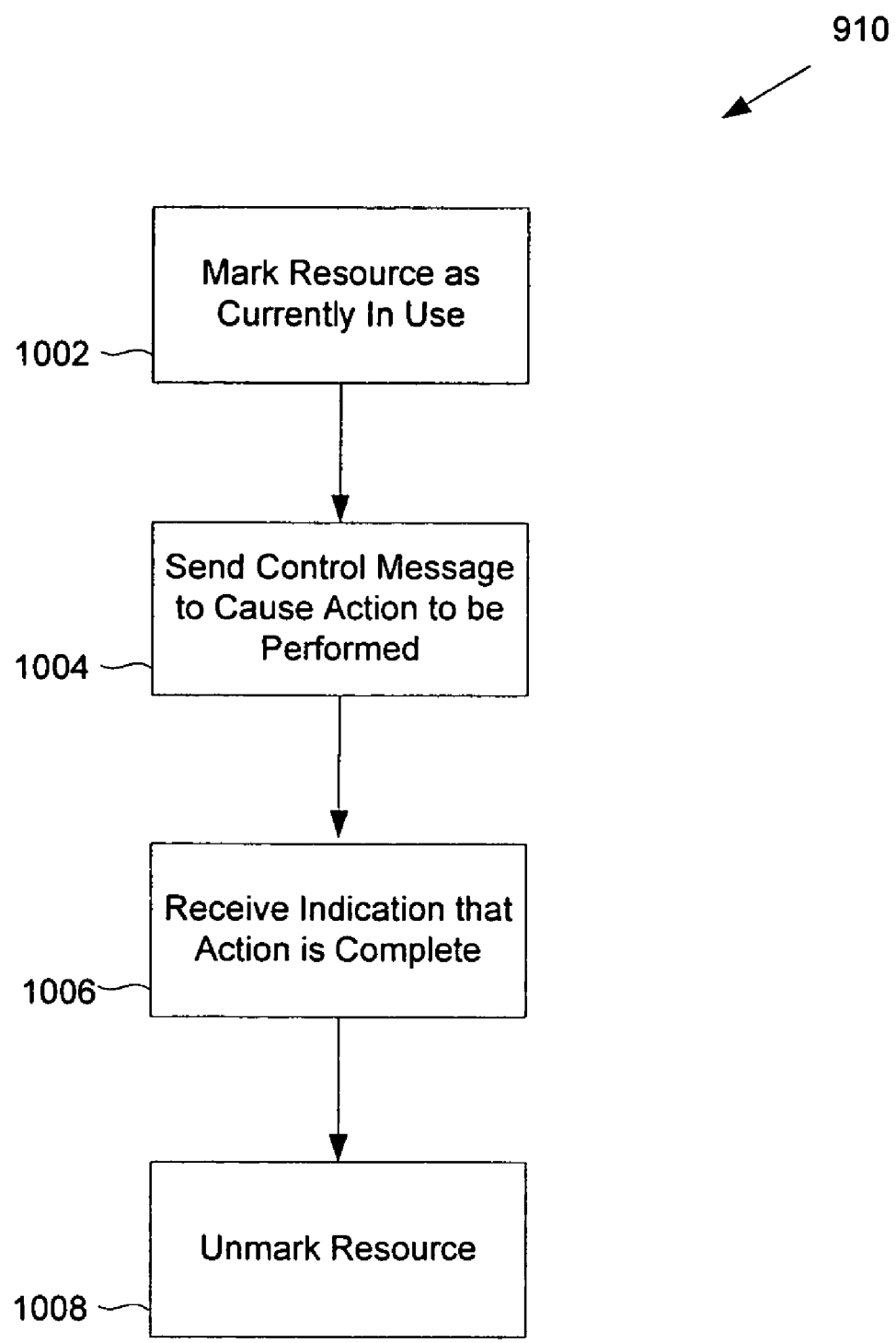
FIG. 10 is a flowchart illustrating a method used in one embodiment to perform an action.

FIG. 10 is a flowchart illustrating a method used in one embodiment to perform an action. In one embodiment, this process is used to perform step 910 of FIG. 9. In this example, the required resource(s) is/are marked as currently in use (1002). For example, if the action is to move a robot, the robot would be marked as currently in use. If the action is to mount a specified tape in a designated drive, a robot, the drive, and the tape would be marked as currently in use. A control message is sent to cause the action to be performed (1004). Step 1004 may comprise commanding a robot to perform the action, controlling a storage device, or gathering information (e.g., auditing tapes in a library). For example, if the action is to move a robot to a particular position, the appropriate command is sent to the LCP to send a control message (e.g., to the library) to cause the robot to be moved to that position. In some embodiments, the action includes a series of component steps, and the LCP sends more than one command to cause the action to be performed. For example, an action to move a tape from a drive to its home slot might require a first command to move the robot to the drive, a second to cause the robot to grab the tape, a third to move the robot to the home slot, a fourth to cause the robot to place the tape in the slot, and a fifth to cause the robot to release the tape and return to its home position. An indication that the action is complete is received (1006). In the case of an action performed by a library robot, for example, the LCP may be configured to determine when the action has been successfully completed and report back to the MLM. The resource(s) used to perform the action are unmarked (i.e., they are no longer marked as "currently in use" (1008). For example, if the action was to move a robot, the robot would be no longer be marked as "currently in use" (or would be marked as "not currently in use", depending on the implementation. If the action was to mount a specified tape in a designated drive, a robot, the drive, and the tape would no longer be marked as "currently in use" or would be marked as "not currently in use", again depending on the implementation.

While the foregoing embodiments focus on media management in the context of backup applications and computer networks, those of ordinary skill in the art will recognize that the same techniques may be used in other contexts and with respect to devices, libraries, and media other than those discussed in detail herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of simultaneously processing media requests, comprising:
   determining whether a removable storage media resource required to service a first request is currently associated with a second request that is currently being serviced;
   in the event that the resource is currently associated with a second request, determining whether the first request can be interleaved with the second request; and
   in the event it is determined that the first request can be interleaved with the second request, interleaving the first request with the second request;
   wherein the resource can only service the first request or the second request at any given time.

2. The method of claim 1, wherein said interleaving comprises using the resource to perform an action associated with the first request without waiting for the servicing of the second request to be completed.

3. The method of claim 1, wherein said interleaving comprises using the resource to perform an action associated with the first request while the resource is still associated with the second request.

4. The method of claim 1, wherein the first request and second request are received from different data movers.

5. The method of claim 1, wherein the removable storage media resource comprises a library.

6. The method of claim 1, wherein the removable storage media resource comprises a robot associated with a library.

7. The method of claim 1, wherein the removable storage media resource comprises a storage device.

8. The method of claim 1, wherein the removable storage media resource comprises a tape drive.

9. The method of claim 1, wherein the removable storage media resource comprises a volume of removable storage media.

10. The method of claim 1, wherein determining whether the first request can be interleaved with the second request comprises comparing a first priority associated with the first request with a second priority associated with the second request.

11. The method of claim 1, wherein determining whether the first request can be interleaved with the second request comprises determining a request type associated with the second request.

12. The method of claim 1, wherein determining whether the first request can be interleaved with the second request comprises determining an estimated time to completion of the second request.

13. The method of claim 1, wherein determining whether the first request can be interleaved with the second request comprises determining an action or actions that remain(s) to be performed to complete the servicing of the second request.

14. The method of claim 1, wherein the extent of interleaving is determined at least in part by a capability associated with a piece of hardware.

15. The method of claim 1, wherein the extent of interleaving is determined at least in part by a user input.

16. A system configured to simultaneously process media requests, comprising:
   a processor configured to:
      determine whether a removable storage media resource required to service a first request is currently associated with a second request that is currently being serviced;
      in the event that the resource is currently associated with a second request, determine whether the first request can be interleaved with the second request; and
      in the event it is determined that the first request can be interleaved with the second request, interleave the first request with the second request; and
   a communication interface configured to send commands, directly or indirectly, to the resource;
   wherein the resource can only service the first request or the second request at any given time.

17. A computer program product for simultaneously processing media requests, the computer program product being embodied in a computer readable medium and comprising computer instructions for:
   determining whether a removable storage media resource required to service a first request is currently associated with a second request that is currently being serviced;
   in the event that the resource is currently associated with a second request, determining whether the first request can be interleaved with the second request; and
   in the event it is determined that the first request can be interleaved with the second request, interleaving the first request with the second request;
wherein the resource can only service the first request or the second request at any given time.

* * * * *